United States Patent
Lewis

(10) Patent No.: US 6,307,345 B1
(45) Date of Patent: Oct. 23, 2001

(54) RESONANT CIRCUIT CONTROL SYSTEM FOR STEPPER MOTORS

(76) Inventor: James M. Lewis, 11405 Alabama Hwy. 33, Moulton, AL (US) 35650

(*) Notice: Subject to any disclaimer, the term of this patent is extended or adjusted under 35 U.S.C. 154(b) by 0 days.

(21) Appl. No.: 09/495,709

(22) Filed: Feb. 1, 2000

(51) Int. Cl.[7] .................................................. H02P 8/00
(52) U.S. Cl. ........................................... 318/696; 318/685
(58) Field of Search .................................... 318/685, 696

(56) References Cited

U.S. PATENT DOCUMENTS

| | | | |
|---|---|---|---|
| 4,025,859 | * 5/1977 | Smith | 318/696 |
| 4,253,052 | * 2/1981 | Meier | 318/696 |
| 4,322,772 | * 3/1982 | Fry | 361/111 |
| 4,445,077 | * 4/1984 | Kirschner | 318/696 |
| 4,451,775 | * 5/1984 | Phillips et al. | 322/10 |
| 4,458,191 | * 7/1984 | Fare | 318/696 |
| 4,506,207 | * 3/1985 | Ferrari | 318/696 |
| 4,514,675 | * 4/1985 | Matumoto et al. | 318/696 |
| 4,540,928 | 9/1985 | Marhoefer | 318/696 |
| 4,651,076 | 3/1987 | Oltendorf et al. | 318/696 |
| 4,710,691 | 12/1987 | Bergstrom et al. | 318/696 |
| 4,739,346 | * 4/1988 | Buckley | 346/138 |
| 4,757,247 | * 7/1988 | Ranger | 318/696 |
| 5,115,181 | 5/1992 | Sood | 318/701 |
| 5,304,910 | * 4/1994 | Loncle et al. | 318/696 |
| 5,402,052 | 3/1995 | Cheng et al. | 318/696 |
| 5,446,359 | 8/1995 | Horst | 318/701 |
| 5,498,946 | * 3/1996 | Plumer et al. | 318/809 |
| 5,689,164 | 11/1997 | Hoft et al. | 318/701 |
| 5,923,143 | * 7/1999 | Cosan et al. | 318/729 |

* cited by examiner

Primary Examiner—Robert E. Nappi
Assistant Examiner—Rina I. Duda
(74) Attorney, Agent, or Firm—Welsh & Flaxman LLC

(57) ABSTRACT

A stepper motor control system is disclosed. The stepper motor including a rotor positioned within a stator for relative motion. The stepper motor further includes a control system associated with the stator and rotor for controlling relative motion. The control system is a resonant circuit which conserves electrical charge includes a first winding positioned between a first electrical charge source and a first capacitor assembly; a first switch controlling the flow of electrical charge between the first electrical charge source and the first capacitor assembly through the first winding in a first direction; and a second switch controlling the flow of electrical charge from the first capacitor assembly and through the first winding in a second direction. In use, phase one begins with the opening of the first switch, causing the flow of electrical charge through the first winding in a first direction and a predetermined relative movement between the stator and rotor. Phase two begins by closing the first switch and opening the second switch to cause the flow of electrical charge in the second direction from the first capacitor assembly and through the first winding. This causes a predetermined relative movement between the stator and rotor.

32 Claims, 6 Drawing Sheets

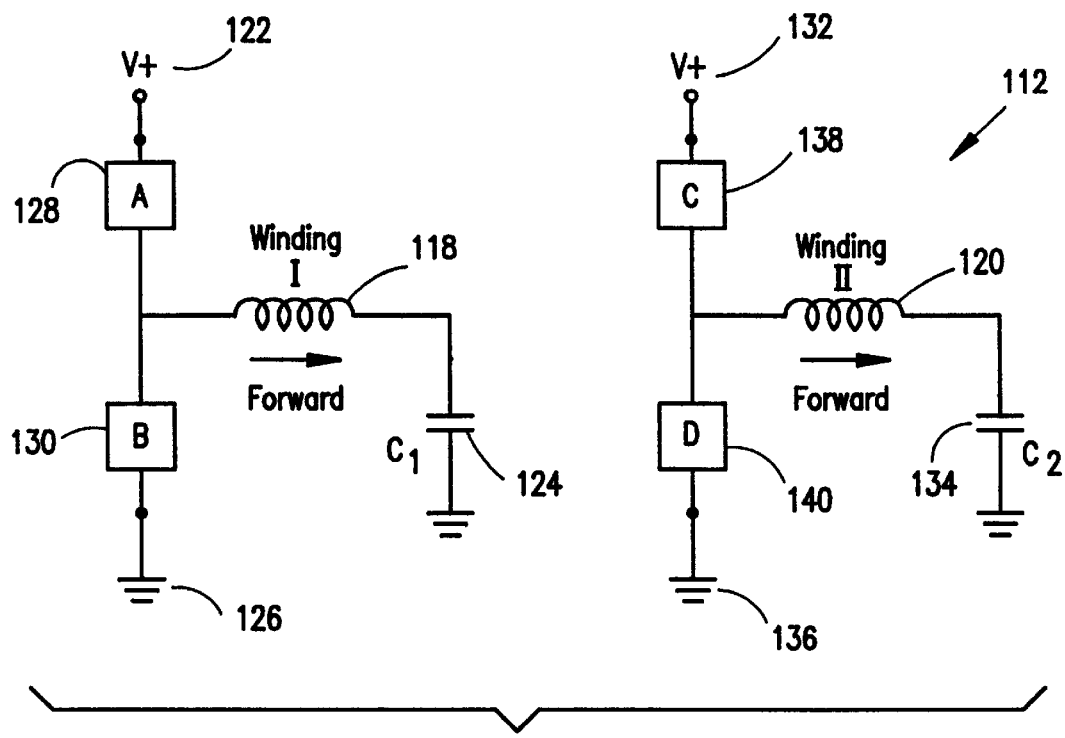
FIG. 3
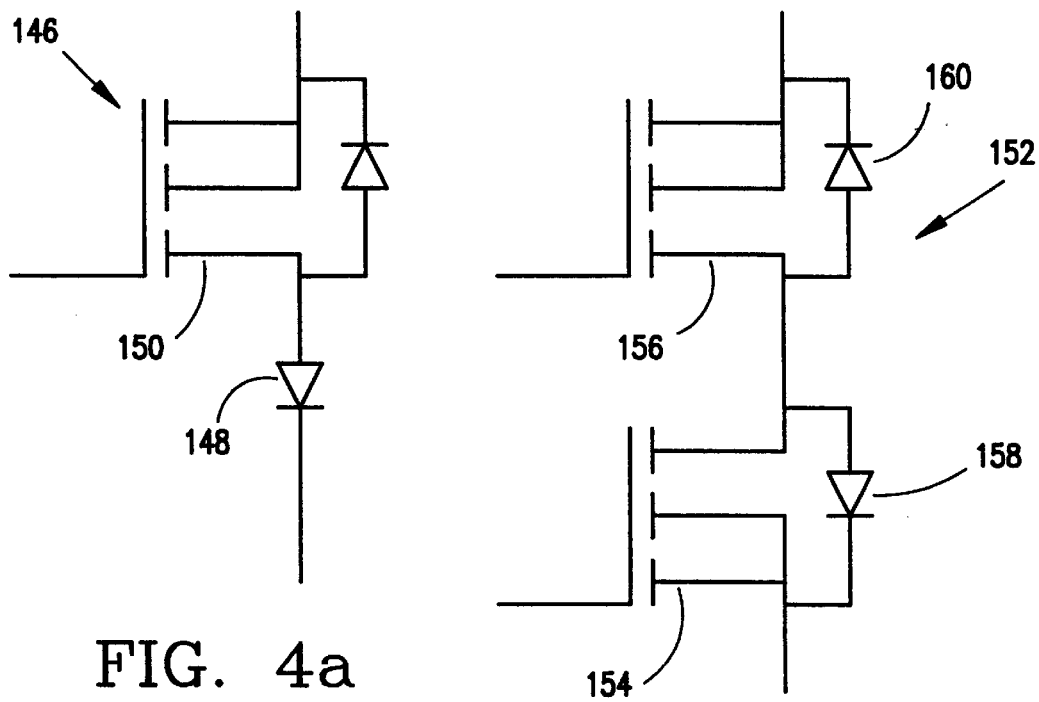
FIG. 4a
FIG. 4b

RESONANT CIRCUIT CONTROL SYSTEM FOR STEPPER MOTORS

BACKGROUND OF THE INVENTION

1. Field of the Invention

The invention relates to stepper motors. More particularly, the invention relates to a resonant circuit control system designed to effectively conserve energy during the operation of a stepper motor.

2. Description of the Prior Art

The use and theory of stepper motors are well developed. The term "stepper motor" is known to describe, but is not limited to, switched reluctance motors, variable reluctance motors, electronically commutated reluctance motors, variable reluctance stepper motors, brushless DC motors, and other forms of stepper motors. Stepper motors may have a bipolar or unipolar construction. Bipolar motors have a rotor constructed using permanent magnets and unipolar motors have a rotor constructed of soft iron materials (or related materials) that respond to the magnetic field produced by the stator.

The general operating principle of a stepper motor relies upon a winding mounted on a stator to conduct or block current based on the position of the rotor. As such, stepper motors are generally constructed without the brushes commonly found in electric motors. In place of brushes, the stepper motor depends on switches to control the flow of electrical charge through a particular phase winding. Stepper motors advantageously offer the ability to control the exact increment of motion, or the change in a rotor angle, by the use of a control system. Each winding relates to a specific phase and each phase to a specific increment or angular change from the previous phase. This incremental change in angle is referred to as a "step", hence the general description of this family of devices as stepper motors.

Prior art stepper motors have been designed with resonant systems for driving the motor. However, no prior art stepper motors have been disclosed which use capacitors to efficiently capture and recycle most of the charge passing through a winding.

With reference to the control system disclosed in FIG. 1, a two winding system for a bipolar stepper motor 1 is disclosed. In operation, the first switches 2a, 2b are turned on (all other switches are not conducting) and electrical charge flows through the first winding 3 in the forward direction as indicated by the arrow. This produces the first phase of the stepper motor sequence. The second phase is produced by turning the third switches 5a, 5b on (all other switches are turned off) to energize the second winding 6 with electrical charge flowing in the noted forward direction. The third phase is produced by turning on the second switches 6a, 6b while all other switches are off. This allows electricity to flow in the reverse direction through the first winding 3. Finally, the fourth phase occurs when all switches are turned off except the fourth switches 7a, 7b, allowing the second winding 6 to be energized with electrical charge flowing in the reverse direction.

This conventional arrangement of switches and windings in a bipolar stepper motor is referred to as an H-bridge (where the winding is the cross member of the H and the switch circuit composes the uprights). The current flow through the switches of the H-bridge are unidirectional and the current flow through the winding is bidirectional (hence the quote bipolar stepper).

The phase process is repeated with the rotor of the stepper motor turning a discrete amount for each phase. The stepper motor is locked or held in position by leaving one phase active. In the case of holding or locking, the current flowing through the winding exerts a given magnetic force on the permanent magnets in the motor to produce a holding torque. If the phases are switched too slowly, the stepper actually locks momentarily (achieves holding torque) in each phase, causing a jerking motion often accompanied by a clicking sound.

The prior art control systems, however, expend substantial energy in cycling through the many phases. As such, a need exists for a more efficient control system to be used in the operation of unipolar and bipolar stepper motors. The present invention provides such a control system.

SUMMARY OF THE INVENTION

It is, therefore, an object of the present invention to provide a stepper motor including a rotor positioned within a stator for relative motion. The stepper motor further includes a control system associated with the stator and rotor for controlling relative motion. The control system is a resonant circuit which conserves electrical charge includes a first winding positioned between a first electrical charge source and a first capacitor assembly; a first switch controlling the flow of electrical charge between the first electrical charge source and the first capacitor assembly through the first winding in a first direction; and a second switch controlling the flow of electrical charge from the first capacitor assembly and through the first winding in a second direction. In use, phase one begins with the opening of the first switch, causing the flow of electrical charge through the first winding in a first direction and a predetermined relative movement between the stator and rotor. Phase two begins by closing the first switch and opening the second switch to cause the flow of electrical charge in the second direction from the first capacitor assembly and through the first winding. This causes a predetermined relative movement between the stator and rotor.

It is also an object of the present invention to provide a stepper motor including a second winding positioned in communication with a second capacitor assembly.

It is a further object of the present invention to provide a stepper motor including a third switch controlling the flow of electrical charge through the second winding in a first direction and into the second capacitor assembly, and a fourth switch controlling the flow of electrical charge from the second capacitor assembly and through the second winding in a second direction. In use, phase three begins with the opening of the third switch causing the flow of electrical charge through the second winding in a first direction to cause a predetermined relative movement between the stator and rotor, and phase four begins with closing the third switch and opening the fourth switch to cause the flow of electrical charge in the second direction through the second winding thus causing a predetermined relative movement between the stator and rotor.

It is another object of the present invention to provide a stepper motor wherein the first and second windings are electrically linked.

It is also another object of the present invention to provide a stepper motor wherein the stepper motor is bipolar.

It is yet a further object of the present invention to provide a stepper motor wherein the stepper motor has a unipolar configuration.

It is still another object of the present invention to provide a stepper motor including a third winding positioned in communication with a capacitor assembly and a fourth winding positioned in communication with a capacitor assembly.

It is also an object of the present invention to provide a stepper motor wherein the first, second, third and fourth windings are electrically linked.

It is a further object of the present invention to provide a stepper motor wherein the first capacitor assembly includes a series of capacitors adapted to control the capacitance of the control system.

It is a still a further object of the present invention to provide a stepper motor wherein the flow of electrical charge to the series of capacitors is controlled by a series of switches associated with the series of capacitors.

It is another object of the present invention to provide a stepper motor wherein the series of capacitors are connected in parallel.

It is also an object of the present invention to provide a stepper motor wherein each capacitor in the series of capacitors has half the capacitance of the previous capacitor.

It is a further object of the present invention to provide a stepper motor wherein at least one of the first and second switches is a unidirectional switch.

It is still another object of the present invention to provide a stepper motor wherein the unidirectional switch includes a bias diode and a MOSFET.

It is yet a further object of the present invention to provide a stepper motor wherein at least one of the first and second switches is a bidirectional switch.

It is also an object of the present invention to provide a stepper motor wherein the bidirectional switch includes first and second MOSFETs.

It is a further object of the present invention to provide a control system adapted for associated with the stator and rotor of a stepper motor for controlling their relative movement control the movement of the stepper motor. The control system includes a first winding positioned between an electrical charge source and a first capacitor assembly; a first switch controlling the flow of electrical charge between the electrical charge source and the first capacitor assembly through the first winding in a first direction; a second switch controlling the flow of electrical charge from the first capacitor assembly through the first winding in a second direction; a second winding positioned in communication with a second capacitor assembly; a third switch controlling the flow of electrical charge through the second winding in a first direction and into the second capacitor assembly; and a fourth switch controlling the flow of electrical charge from the second capacitor assembly through the first winding in a second direction. In use, phase one begins within the opening of the first switch causing the flow of electrical charge through the first winding in a first direction and a predetermined relative movement between the stator and rotor, phase two begins within the opening of the third switch causing the flow of electrical charge through the second winding in a first direction and a predetermined relative movement between the stator and rotor, phase three begins with closing the first switch and opening the second switch to cause the flow of electrical charge in the second direction through the first winding thus causing a predetermined relative movement between the stator and rotor, and phase four begins with closing the fourth switch and opening the second switch to cause the flow of electrical charge in the second direction through the second winding thus causing a predetermined relative movement between the stator and rotor.

It is also an object of the present invention to provide a control system wherein the control system employs a resonant circuit.

It is another object of the present invention to provide a control system wherein the control system conserves electrical charge.

Other objects and advantages of the present invention will become apparent from the following detailed description when viewed in conjunction with the accompanying drawings, which set forth certain embodiments of the invention.

BRIEF DESCRIPTION OF THE DRAWINGS

FIG. 3 is a circuit diagram of a control system for use with bipolar stepper motors in accordance with the present invention.

FIGS. 4a and 4b are circuit diagrams of switches used in accordance with the present invention.

DESCRIPTION OF THE PREFERRED EMBODIMENTS

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as the basis for the claims and as a basis for teaching one skilled in the art how to make and/or use the invention.

Figure 1:
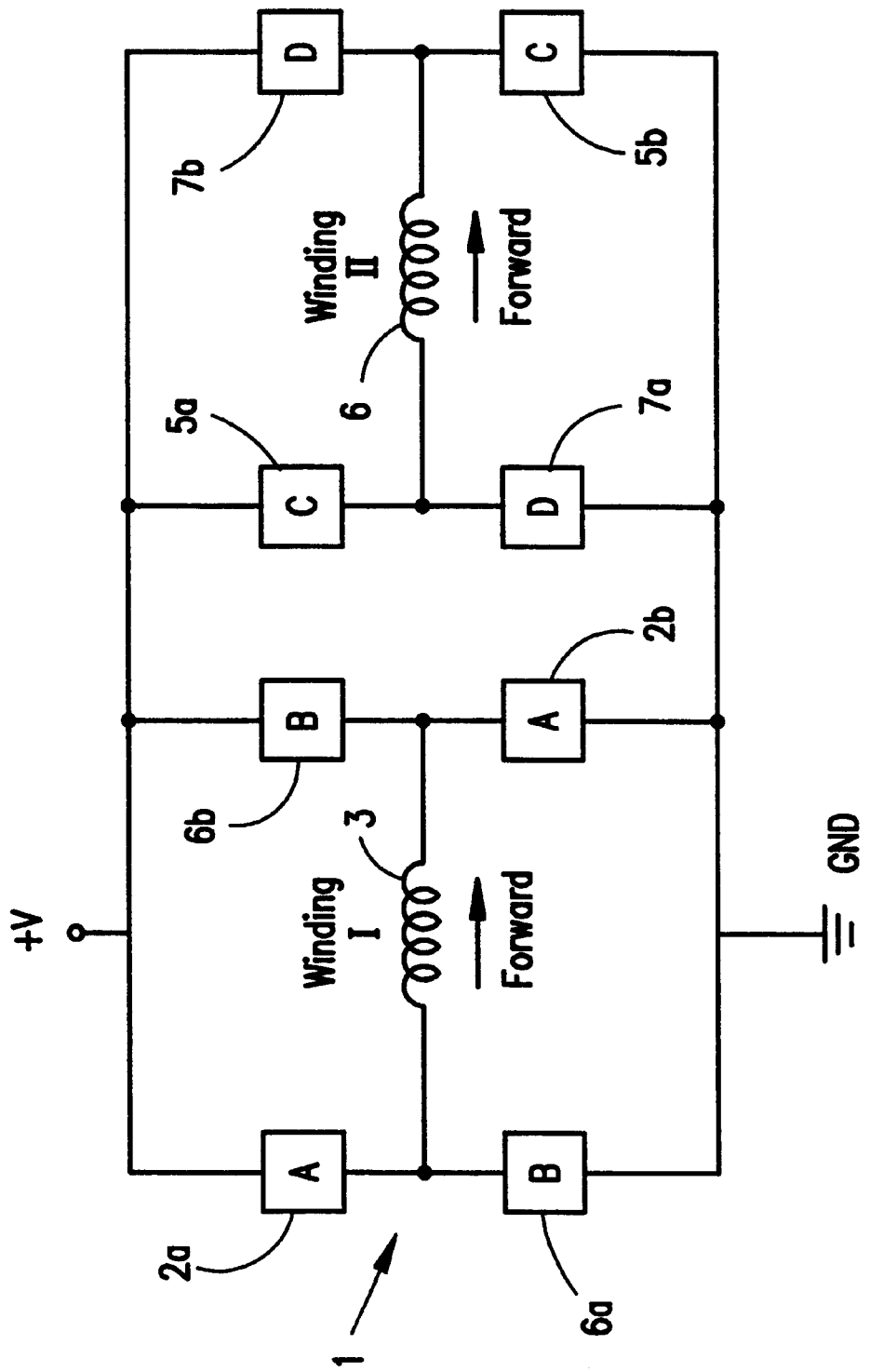
FIG. 1 is a circuit diagram of a prior art control system.
Figure 2:
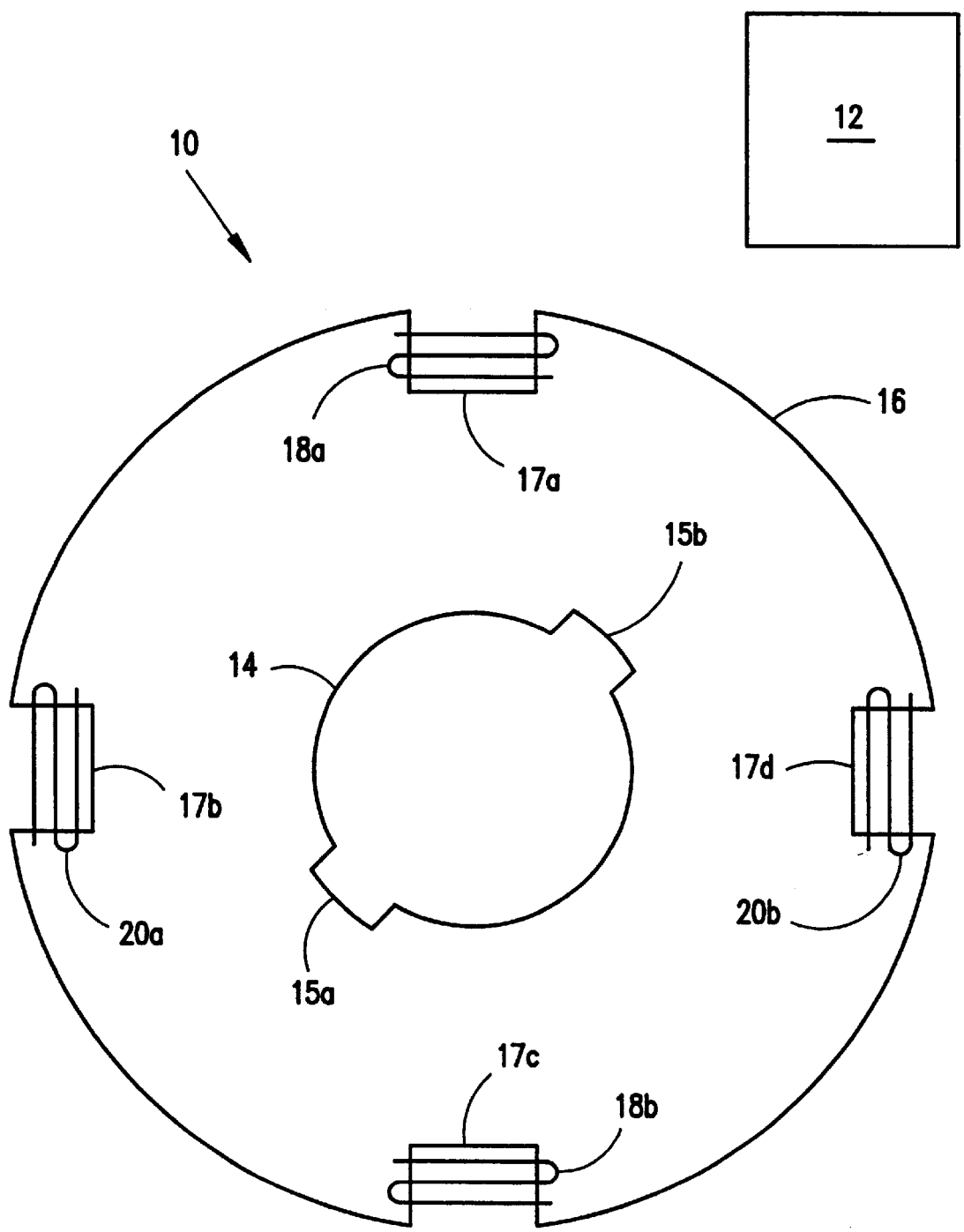
FIG. 2 is a schematic of a conventional stepper motor.

With reference to FIG. 2, a stepper motor 10 employing the present control system 12 is disclosed. As will be discussed in substantial detail below, the control system 12 employs routing switches and dynamically adjustable capacitors allowing the stepper motor system to behave as a resonant circuit. The resulting system improves energy efficiency and power when compared to prior stepper motor systems.

In addition, the capacitor assembly described below allows the stepper motor to accelerate or decelerate, and to be tuned to operate efficiently at any operating speed (angular velocity or stepping frequency).

The routing switches employed in the present invention allow electrical charge to be stored and recycled in subsequent stepper phases, adding to the system efficiency. The switches also allow for the resonant system to be "pumped" from a power source to maintain optimal operation of the resonant system. The system is also able to adjust for changes in load. The system further employs current and voltage sensors, as well as a digital control system.

The various switches used in the embodiments described throughout the body of the specification are controlled by implementing various sensors throughout the control circuit.

Figure 7:
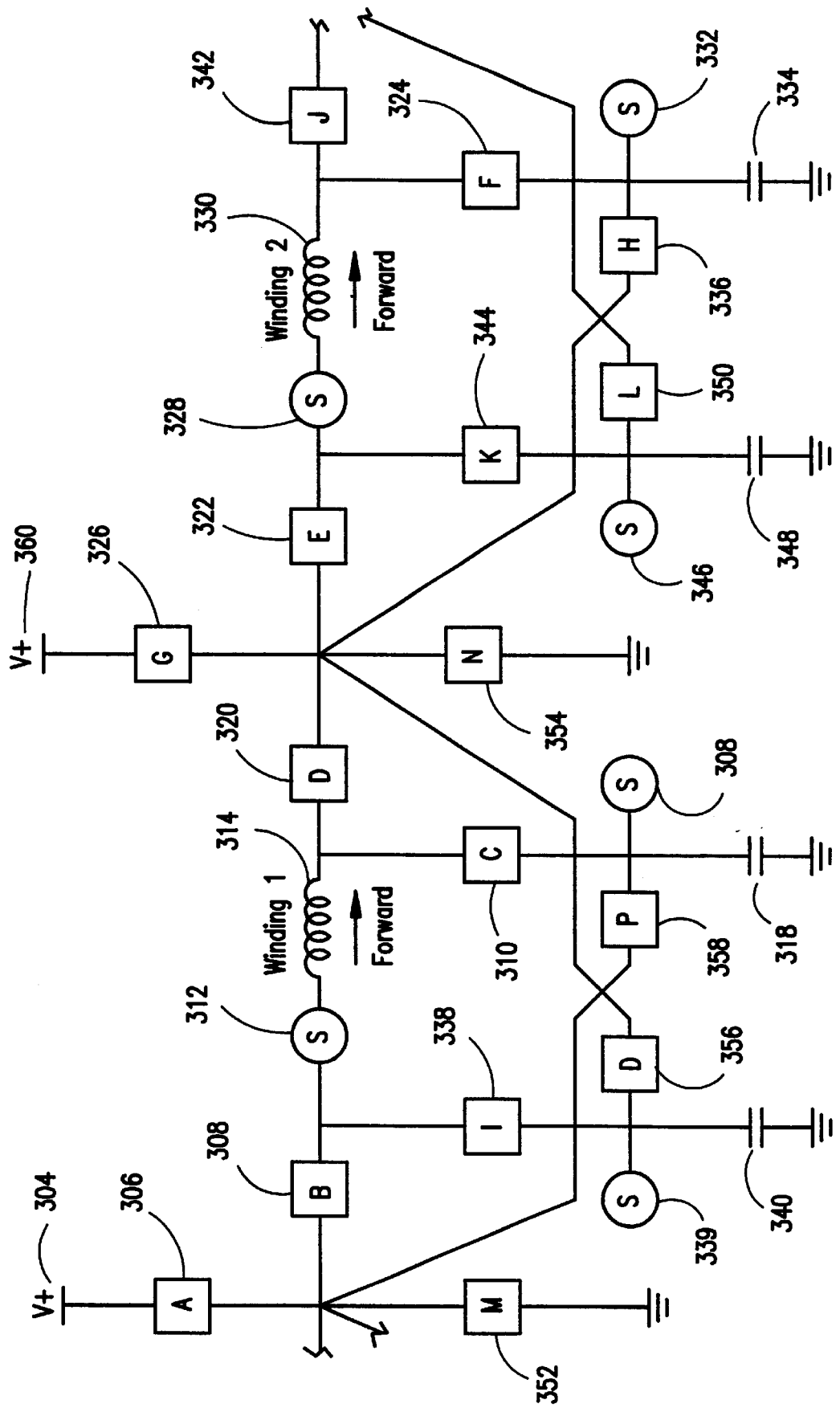
FIG. 7 is a circuit diagram of yet another control system for use with bipolar stepper motors in accordance with the present invention.

Specifically, and as disclosed in detail with reference to the embodiment disclosed in FIG. 7, voltage sensors are employed to detect the stored charges in the capacitor assemblies and current sensors detect the current flow at various points within the circuit. The voltage and current information is applied to determine when switches are to be opened, closed or reversed.

With the foregoing in mind, the present resonant stepper motor system composed of a stepper motor, routing switches and dynamically adjustable capacitor assemblies is not limited to any specific number of phases or type of stepper motor, but can be applied to the entire scope of stepper motor applications. The present control system 12 is adapted for use with a wide variety of electric motors which may be generally classified as stepper motors. For example, and for the purpose of the present specification, stepper motors are considered to include, but are not limited to, switched reluctance motors, variable reluctance motors, electrically commutated reluctance motors, variable reluctance stepper motors, brushless DC motos, as well as other forms of stepper motors.

As will be discussed in greater detail below, the present control system 12 may be readily adapted for use with either bipolar or unipolar stepper motors. Those skilled in the art will readily appreciate that bipolar stepper motors have a rotor constructed using permanent magnets and unipolar stepper motors have a rotor constructed from soft iron, or related materials, which responds to the magnetic field generated by the stator.

Referring to FIG. 2, a simplified schematic of a conventional bipolar stepper motor 10 is disclosed. The illustrated stepper motor 10 has a rotor 14 with two salient poles 15a, 15b cooperating with a stator 16 having four salient poles 17a–17d. Each of the stator poles 17a–17d is provided with a winding, respectively. In accordance with a preferred embodiment of the present invention, the first windings 18a, 18b and second windings 20a, 20b are employed to create first, second, third and fourth phases. More specifically, the first windings 18a, 18b are connected in series and used to generate the first and third phases and the second windings 20a, 20b are connected in series and used to generate the second and fourth phases.

In use, the phases are energized in a predetermined manner, causing the nearest poles of the rotor 14 to rotate and align with the stator poles associated with the energized windings. By sequentially energizing each phase of the stator 16, the rotor 14 is caused to rotate. Although the general operation of stepper motors is well known to those skilled in the art, a detailed discussion of their operation may be found in *Electrical Motors and Control Techniques* by Irving Gottlieb, McGraw Hill 1994, pp. 221–247, Chapt. 7 and *Electric Drives Concepts and Applications* by Subrahmnanyam, McGraw Hill 1994, pp. 699 et seq.

Throughout the present specification, the term "electrical charge" is used. The term is used in its broadest sense to encompass all forms of electrical force and is used throughout this disclosure to describe, for example, voltage (e.g., charge stored in a capacitor) or current (e.g., charge flowing through a winding).

Referring now to FIG. 3, a preferred embodiment of a control system 112 in accordance with the present invention is disclosed. The control system 112 includes a first winding 118 positioned between a first electrical charge source 122, a first capacitor assembly 124 and a first ground 126. As will be discussed below in greater detail, the flow of electrical charge from the first electrical charge source 122 to the first capacitor assembly 124 defines the first phase of the present stepper motor.

A first switch 128 controls the flow of electrical charge between the first electrical charge source 122 and the first capacitor assembly 124 through the first winding 118 in a first direction. A second switch 130 controls the flow of electrical charge between the first capacitor assembly 124 and the first ground 126 through the first winding 118 in a second direction. The flow of electrical charge in the second direction defines the third phase of the present stepper motor.

The control system 112 further includes a second winding 120 through which the second and fourth phases are generated. The second winding 120 is positioned between a second electrical charge source 132, a second capacitor assembly 134 and a second ground 136. As with the first winding 118, the flow from the second electrical charge source 132 to the second capacitor assembly 134 defines the second phase of the present stepper motor. A third switch 138 controls the flow of electrical charge between the second electrical charge source 132 and the second capacitor assembly 134 through the second winding 120 in a first direction to generate the second phase of the present stepper motor. A fourth switch 140 controls the flow of electrical charge between the second capacitor assembly 134 and the second ground 136 through the second winding 120 in a second direction to create the fourth phase of the present stepper motor.

In use, and assuming the first and second capacitor assemblies 124, 134 are both discharged at the start, the first switch 128 is opened (with the second switch 130 closed) to permit the flow of electrical charge between the first electrical charge source 122 and the first capacitor assembly 124. The electrical charge moving between the first electrical charge source 122 and the first capacitor assembly 124 flows in the first direction, or forward direction, through the first winding 118 and into the first capacitor assembly 124 until the current through the first winding equals zero.

Specifically, it has been discovered that the capacitor assembly cannot overcharge if the switch is not permitted to continue conducting. The inductive buck of the winding pulls current until the resonant cycle has achieved balance. At that point, the diode (discussed subsequently with reference to FIGS. 4a and 4b) ensures that the switch timing can be slightly off. If the capacitor assembly is improperly sized for the rate at which the stepper motor is operating, the capacitor assembly may not reach V+ before the end of a phase or the capacitor assembly can become overcharged before the rotor reaches its proper position. Therefore a need exists to provide an adjustable capacitor assembly in the manner discussed below with reference to FIG. 5.

As those skilled in the art will readily appreciate, the first capacitor assembly 124, as well as the other capacitor assemblies discussed throughout the body of the present specification, are properly sized to allow enough current to flow through the first winding 118 to move the stepper rotor the correct angular distance. When the first capacitor assembly 124 is properly sized (of correct capacitance) for the switch pulse (the duration of time that first switch 128 is closed), the voltage produced by the current flowing through the inductive winding ($V_L \approx L^{DI}/_{DT}$) will cooperate with the current in the capacitor ($IC = C^{DV}/_{DT}$) to force the capacitor to "overcharge"; that is, to charge to a voltage potential above the positive supply of voltage. Although charging of the capacitor assembly is discussed above with reference to the first capacitor assembly 124, the teachings presented above are equally applicable to the various capacitor assemblies discussed throughout the present specification.

The switches are opened and closed based on current flow through the associated windings. Sensing of this current may be achieved by measuring the voltage across the coil or by measuring the voltage across a current sensing shunt or resistor in series with the winding. By allowing the switch to conduct until current flow ceases, the inductive buck of the motor winding is used to help power the motor and add to the system efficiency. This inductive buck also forces the capacitor to "overcharge" or reach a voltage greater than V+. The inductive response has the net effect of "pulling" current through the diodes associated with the switches.

As briefly discussed above, if the capacitor is improperly sized for the rate at which the stepper is operating, the capacitor may not reach V+ before the end of the phase or the capacitor can become "overcharged" before the rotor reaches the proper position. In accordance with the present invention, the need for capacitance adjustment is remedied by the adjustable capacitance assembly discussed below with reference to FIG. 5. This problem is further dealt with by the provision of the unidirectional and bidirectional switches discussed below with reference to FIGS. 4a and 4b.

It is, therefore, important that the first switch 128 includes a diode biased to permit the continued flow of electrical charge from the first electrical charge source 122 and to restrict the flow of current back to the electrical charge source 122. The present system, therefore employs HexFET TMOS power MOSFET switches as shown in FIGS. 4a and 4b.

With reference to the switch disclosed in FIG. 4a, it is a unidirectional switch 146 with current flowing in the direction of the forward bias diode 148. In practice, the switch of FIG. 4a includes a MOSFET 150 which conducts the flow of current from the top to the bottom (i.e., from the voltage source to the system). The inclusion of the forward bias diode 148 in the switch 146 of FIG. 4a prevents the flow of current in a reverse direction.

As to the switch 152 disclosed in FIG. 4b, it is a bidirectional switch. Both MOSFETs 154, 156 employed in this switch are P channel enhancement devices. As such, the lower diode 158, which is integral to the lower MOSFET 154 should "point" downwardly like the forward bias diode 148 of the switch 146 disclosed in FIG. 4a. The switch 152 of FIG. 4b may readily replace the switch 146 of FIG. 4a, while offering additional operation capabilities. For example, if the gates are driven with a sufficiently low voltage (since P channel MOSFETs require negative bias to pass voltage), current may be allowed to pass in either direction or block in either direction.

The switch 152 of FIG. 4b permits the flow of current from the top through the upper MOSFET 156 and through the lower diode 158 associated with the lower MOSFET 154 when the gate on the upper MOSFET 156 is held low. Because of the winding inductance this current flow can even continue after the capacitor system reaches voltage equal to the voltage source. This continued current flow is very important to the pumping of the resonant circuit which is discussed below in greater detail. When the gate of the lower MOSFET 154 is driven low, current flows up through the lower MOSFET 154 and through the upper diode 160 associated with the upper MOSFET 156. The switch 152 then has four distinct operating modes: off, conducting forward, conducting reverse and conducting bidirectionally.

While the disclosed switches are used in accordance with preferred embodiments of the present invention, other switches may be used without departing from the spirit of the present invention. For example, it is contemplated that other semiconductor switches utilizing different types of FET transistors, BJTs and SCRs may be used in accordance with the present invention. The switches may even be designed using relays.

Returning to the operation of the control system 112 disclosed in FIG. 3, the second phase is entered when the third switch 138 is opened. Opening of the third switch 138 permits the flow of electrical charge between the second electrical charge source 132 and the second capacitor assembly 134. The electrical charge moving between the second electrical charge source 132 and the second capacitor assembly 134 flows in the forward direction through the second winding 120 and into the second capacitor assembly 134 until the current through the second winding 120 equals zero.

The third phase is entered by opening the second switch 130 (with the first switch 128 closed). Opening of the second switch 130 permits the flow of electrical charge from the first capacitor assembly 124 to the first ground 126. The flow of electrical charge from the first capacitor assembly 124 to the first ground 126 passes through the first winding 118 in a second direction, or reversed direction, to initiate the third phase.

Finally, the fourth phase is entered by opening the fourth switch 140 (with the third switch 138 closed). Opening of the fourth switch 140 permits the flow of electrical charge from the second capacitor assembly 134 to the second ground 136. The flow of electrical charge from the second capacitor assembly 134 to the second ground 136 passes through the second winding 120 in a second direction, or reversed direction, to initiate the fourth phase. As previously discussed, all phases switching is based on the flow of current through the windings.

The present control system 112 permits the recycling of electrical charge during operation of the stepper motor at a constant speed so long as the phases are cycled through in a predetermined manner. It is interesting to note that the first switch 128 need not be turned off during the second phase since the bias diode in the switch 128 prevents current back flow through the switch and allows the switch to remain opened with zero current flow. Current continues to flow through the first winding 118 after the first capacitor assembly 124 reaches a voltage V+. This "inductive buck", which is a characteristic phenomenon of all inductors, is treated as a problem in prior art control systems and is allowed to dissipate through diodes to the supply rails. In accordance with the present invention, this excess electrical charge is recaptured, and used, instead of being lost.

If the first and second capacitor assemblies 124, 134 are properly sized, the capacitor assemblies 124, 134 may be made to over-discharge to a negative voltage. On the following cycle, an increase in current through the first and second windings 118, 120 is realized since there is a greater voltage difference across the windings. This increased current is due to the resonant effect of the RLC circuit. In a stepper motor operating at a constant velocity and constant load, the voltage in the charged capacitor assemblies will eventually reach a maximum and the voltages in the discharged capacitor assemblies will reach a minimum so that the system is operating in a steady state mode.

Figure 5:
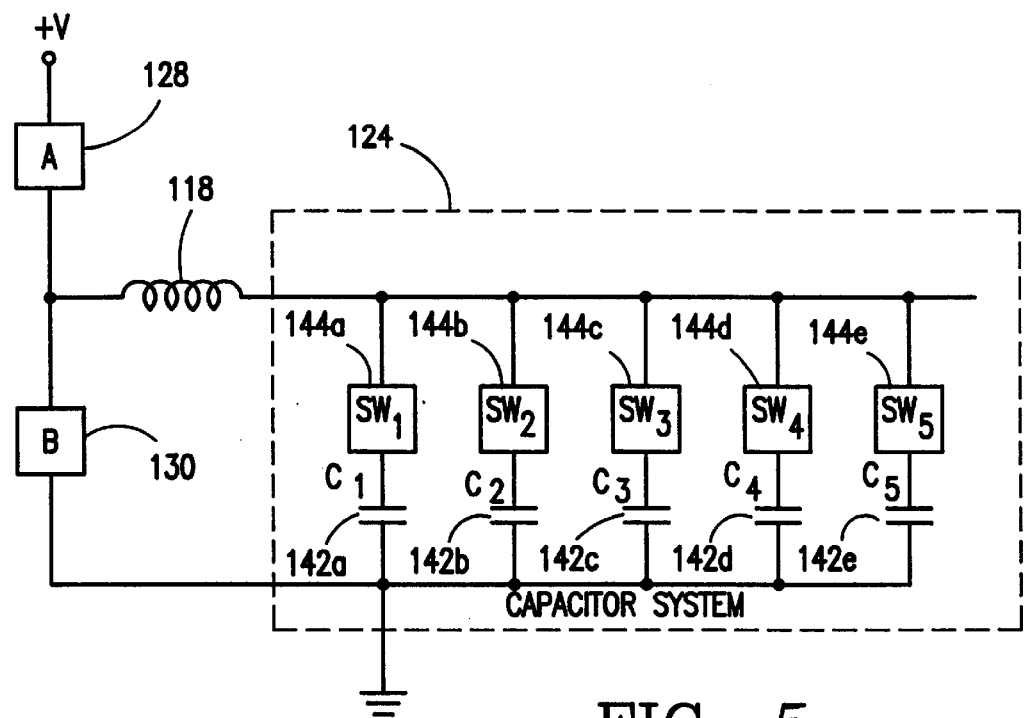
FIG. 5 is a circuit diagram showing the capacitor assembly in detail.

With reference to FIG. 5, the capacitor assemblies 124, 134 discussed above need not be simple single capacitor systems. Specifically, the capacitor assemblies may be constructed in such a way that the capacitance of each assembly may be varied to suit specific applications. Specifically, the first capacitor assembly 124 shown in FIG. 5 includes a series of capacitors 142a–e and associated switches 144a–e connected in parallel to provide a controlled and adjustable capacitance.

In accordance with a preferred embodiment of the invention, each succeeding capacitor 142a–e has half the capacitance of the previous capacitor. That is, the first capacitor 142a has twice the capacitance of the second capacitor 142b, the second capacitor 142b has twice the capacitance of the third capacitor 142c, etc. In use, the various switches 144a–e are turned on and off to combine the capacitance values and produce a composite capacitor offering a desired capacitance.

The final applied capacitance may be controlled in a binary fashion by a micro-controller or a custom digital control circuit. An exponential arrangement of the capacitors may also be used with the various sizing and incremental arrangements of the capacitors being determined based upon the motor's specific application. The usefulness of an exponential arrangement results from the resonant frequency of the circuit (and the speed of the stepper) being proportional to the square root of capacitance.

The capacitors 142a–e and switches 144a–e disclosed in accordance with the embodiment of FIG. 5 may be combined into a single capacitor assembly for use in accordance with the various control system embodiments disclosed herein. As such, the embodiments disclosed in FIGS. 3, 6, 7 and 9 are provided with capacitor assemblies which may take a variety of forms, including the form disclosed in FIG. 5.

With the capacitor assembly 124 of FIG. 5 in place, a stepper motor may freely accelerate or decelerate, and be tuned to operate efficiently at any operating speed (or velocity or stepping frequency). The total number of discrete motor speeds possible is two to the power S, where S is the number of capacitor/switch combinations, or switched capacitors. This value is true of a stepper motor operating under no load. The resonant constant of the circuit changes with load so that the capacitors 142a–e can be switched on and off to maintain speed under changing loads.

The switches 144a–e employed in accordance with the controlled capacitor assembly of FIG. 5 may be identical to those switches described with reference to FIG. 4a, or may comprise any bidirectional device or combination of devices to produce a bidirectional switch as in FIG. 4b. The speed of the capacitor switches 144a–e is not as critical as the speed of the routing switches 128, 130, 138, 140, since the capacitance values are not expected to change every phase cycle. In a stepper motor control system that powers a device which must accelerate to some rate, and then maintain the rate as efficiently as possible for some extended time (such as electric powered vehicles (EPV) and manufacturing equipment), it is anticipated that the capacitor assembly will be allowed to remain at a fairly constant value, occasionally varying slightly to react to a change in load.

Figure 6:
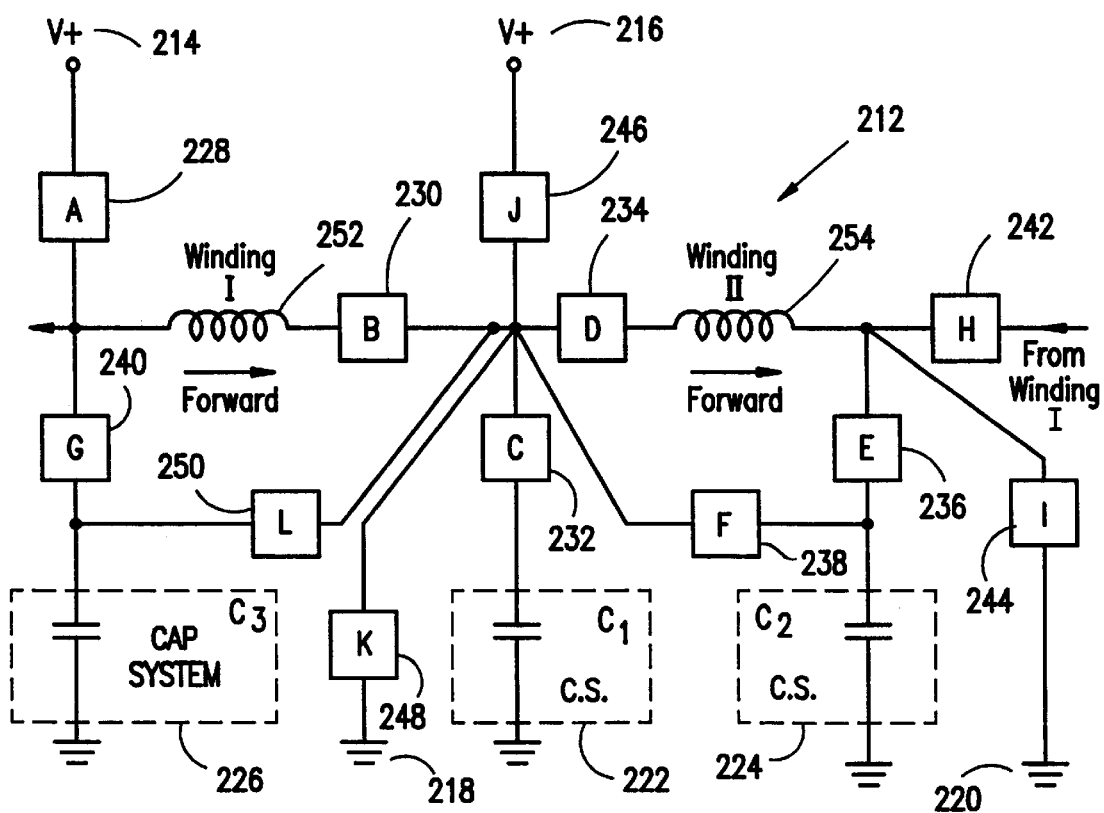
FIG. 6 is a circuit diagram of another control system for use with bipolar stepper motors in accordance with the present invention.

While the embodiment disclosed in FIG. 3 represents a simplistic control system providing a conceptual overview of the control system in accordance with the present invention, FIG. 6 presents a fully developed resonant bipolar stepper motor control system 212. The control system 212 includes first and second electrical charge sources 214, 216, first and second grounds 218, 220, and first, second and third capacitor assemblies 222, 224, 226. In practice, the electrical charge sources are usually connected to a common source and the grounds are also usually connected in each place separate grounds and sources are mentioned.

In addition, the control system 212 includes first, second, third, fourth, fifth, sixth, seventh, eighth, ninth, tenth, eleventh and twelfth switches 228–250 utilized to control the flow of electrical charge through the first and second windings 252, 254. Specifically, the first switch 228, ninth switch 244, tenth switch 246, and eleventh switch 248 are preferably unidirectional switches (for example, the switch disclosed in FIG. 4a), while the remaining switches in the circuit must be bidirectional (for example, the switch disclosed in FIG. 4b).

The control system 212 will now be described by way of reference to its operation. Phase one, that is, electrical charge flows through the first winding 252 in a first direction, is created by turning on the first switch 228, second switch 230 and third switch 232 while all the other switches are turned off. This permits the flow of electrical charge from the first electrical charge source 214 through the first winding 252 in a first, or forward, direction. The electrical charge ultimately flows into, and is stored within, the first capacitor assembly 222.

Phase two, that is, the flow of electrical charge through the second winding 252 in a first direction, is initiated by turning on the third switch 232, fourth switch 234 and fifth switch 236 while the other switches remain off except for tenth switch 246 which remains open for voltage pumping after the capacitor is discharged. The opened switches permit electrical charge to flow from the charged first capacitor assembly 222 through the second winding 254 in a forward direction.

The tenth switch 246 allows additional current to flow from the source voltage as needed to pump the circuit. When the voltage in the capacitor assembly 224 drops below zero, the tenth switch 246 is turned on to allow current to continue to flow through the winding to replace energy dissipated through electrical resistance, heat and work performed. This process is repeated in each phase to continue pumping the circuit. The only energy added is to replace energy expended in work and resistive loss while most of the charge is being recirculated.

The electrical charge is ultimately stored within the second capacitor assembly 224. Those skilled in the art will understand that switched timing (assisted by the biased diodes of the switches previously disclosed with reference to FIGS. 4a and 4b) and capacitance sizing are critical in allowing the first capacitor assembly 222 to discharge as fully as possible and the second capacitor assembly 224 to charge as fully as possible.

Phase three is then entered by opening the second switch 230, sixth switch 238 and seventh switch 240 while the remaining switches are turned off. This permits the flow of electrical charge through the first winding 252 in a second, or reverse, direction to create the third phase. Specifically, electrical charge flows from the second capacitor assembly 224, through the first winding 252 in a second direction, and into the third capacitor assembly 226 where the electrical charge is stored for further use. The pumping in the third phase is accomplished using the tenth switch 246 after capacitor assembly 224 is discharged.

Finally, phase four is initiated by opening the fourth switch 234, eighth switch 242 and eleventh switch 248 while the remaining switches are turned off. With these switches opened, the electrical charge discharges through the second winding 254 in a reverse direction to the first ground 218. Phase four pumping is accomplished using the ground, through the eleventh switch 248 to completely discharge the capacitor assembly.

If necessary, the third switch 232 and fifth switch 236 may be opened during the fourth phase to allow the first and second capacitor assemblies 222, 224 to completely discharge. In fact, when the stepper motor is operating at resonant frequencies, complete discharge in this manner should not be necessary since the capacitor assemblies may actually have negative voltages.

The use of an electrical charge of V+ in phase one and a ground in phase four serve to "pump" the resonant system. After the initial cycle, the first switch 228 and tenth switch 246, which control electrical charge flow from the first and second electrical charge sources 214, 216, are closely timed to allow pumping when the respective capacitor assembly voltages are below V+ as detected by voltage sensors. Similarly, the ninth switch 244 and eleventh switch 248 are controlled to provide negative pumping. The first switch 228, ninth switch 244, tenth switch 246 and eleventh switch 248 may also be used to hold the stepper motor in any phase such that the system 212 is capable of accelerating, responding to loads, stopping motion and holding in position. In fact, the second switch 230 or fourth switch 234 may be eliminated without affecting operation.

The twelfth switch 250 is necessary for reverse operation of the stepper motor. In reverse operation, phase four is initiated by opening the third switch 232, fourth switch 234 and eighth switch 242, phase three is initiated by opening the second switch 230, third switch 232 and seventh switch 240, phase two is initiated by opening the fourth switch 234, fifth switch 236 and twelfth switch 250 and phase one is initiated by opening the second switch 230, fifth switch 236, eighth switch 242 and eleventh switch 248.

The complete discharge of the capacitor assembly in phase four of the circuit disclosed with reference to FIG. 6 is somewhat inefficient and FIG. 7 discloses a circuit capable of operating continuously without dumping charge to ground, reversing from any phase and holding the rotor stationary in any phase. The disclosed circuit 302 is designed to permit any capacitor assembly to drive either winding in either direction and may receive current from either winding in either direction. This functionality allows the circuit to efficiently start from any position to either forward or reverse direction regardless of the charged or discharged condition of the capacitors, to hold the rotor stationary in any phase and to continuously operate in resonant mode with positive and/or negative pumping in all phases as needed.

While the following disclosure presents a preferred operating procedure, those skilled in the art will readily appreciate the numerous current routing paths possible with the disclosed circuit. In addition, the symmetrical nature of this circuit allows each half to operate separately or independently of the other so that overlapping phases may be used.

In operation, the first phase is initiated by routing current from the voltage supply 304 by allowing the first switch 306 (conducting down), the second switch 308 (conducting to the right) and the third switch 310 (conducting down) to conduct while all other switches are off. This configuration allows current to flow from the voltage supply 304, through the first and second switches 306, 308, through a first sensor 312, through the first winding 314 in the forward direction, through the third switch 310, past the first voltage sensor 316 and into the first capacitor assembly 318. Since this is the starting phase, no capacitor assemblies have any stored charge and the power supply must provide all current and charge.

The current flows until the first current sensor 312 indicates that no forward current is flowing through first winding 314. Due to the inductive/capacitive nature of the circuit, current will continue to flow after the voltage in the first capacitor assembly 318 exceeds V+. The first voltage sensor 316 helps determine the resonant tuning of the system. The forward bias diodes in the routing switches allow the current to continue to flow forward until the first phase reaches equilibrium (no more forward current) and the diodes serve as switching components to simplify control.

Once the first current sensor 312 indicates that the first phase is complete, the second phase is started. In the second phase the third switch 310 is conducting upward, the fourth switch 320 is conducting to the right, the fifth switch 322 is conducting to the right and the sixth switch 324 is conducting in the down direction. The seventh switch 326 is used to pump additional current, but is not conducting at the beginning of the phase. All other switches are off.

This switching configuration allows current to flow from the first capacitor assembly 318 through the third, fourth and fifth switches 310, 320, 322, through the second current sensor 328, through the second winding 330, through sixth switch 324, past the second voltage sensor 332, and into the second capacitor assembly 334. Power must be supplied until the second current sensor 328 indicates the system has equalized. This continuing supply of power is accomplished by allowing the seventh switch 326 to begin conducting as soon as the first voltage sensor 308 indicates a negative voltage in the first capacitor assembly 318. Because of the forward bias diodes in the third and fourth switches 310, 320, these switches can remain on until after the seventh switch 326 has begun conducting; the diodes again simplifying the switching timing. The switches used in this phase will continue to conduct until the second current sensor 328 indicates that current has ceased to flow through the second winding 330, at which time the third phase will begin.

The third phase is initiating by opening the eighth switch 336 to conduct in the left direction, the fourth switch 320 to conduct to the left and the ninth switch 338 to conduct in the down direction. The seventh switch 326 again provides the positive pumping. The third phase begins with eighth, fourth and ninth switches 336, 320 and 338 conducting to allow current to flow from the second capacitor assembly 334, through the eighth and fourth switches 336, 320, through the first winding 314 in the reverse direction, through the first current sensor 312, through the ninth switch 338, past the voltage sensor 339, and into the third capacitor assembly 340. When the voltage measured at the second voltage sensor 332 becomes negative, the phase will change to pumping mode by allowing the seventh switch 326 to conduct as described in the second phase. The third phase will continue until the first current sensor 312 indicates that the system has stabilized (current has ceased flowing through first winding 314), at which time the fourth phase will begin.

The fourth phase is accomplished by allowing the ninth switch 338 to conduct in the up direction, the second switch 308 to conduct in the left direction, the tenth switch 342 to conduct in the left direction, and eleventh switch 344 to conduct in the down direction. The first switch 306 provides the pumping when the charge stored in the third capacitor assembly 340 is exhausted. With these switches conducting as described, current flows from the third capacitor assembly 340, through the ninth, second and tenth switches 338, 308, and 342, through the second winding 330 in the reverse direction, through the second current sensor 328, through the eleventh switch 344, past the fourth voltage sensor 346, and into the fourth capacitor assembly 348. When the voltage sensor 339 indicates a negative voltage, the first switch 306 is allowed to conduct, providing additional current to pump the circuit. As in the other phases, the pumping will continue until the second current sensor 328 indicates that the flow of current has ceased.

At this point, the motion of the motor is continued by returning to the first phase, but this time, the first phase will also have recycled charge of which to take advantage. With this in mind, the first phase during continuous operation is accomplished by opening the twelfth switch 350, the second switch 308 and the third switch 310. The first switch 306 is utilized for pumping the circuit during the first phase. With the twelfth, second and third switches 350, 308, 310 open, current flows from the fourth capacitor assembly 348, through the twelfth switch 350 and the second switch 308, through the first current sensor 312, through the first winding 314 in the forward direction, through third switch 310, past the first voltage sensor 316, and into the first capacitor assembly 318. As in the phases previously discussed, the fourth voltage sensor 346 is used to determine when the pumping phase is to begin and the first current sensor 312 is used to determine when the phase is to end.

In operating the system described above, it should be understood that the voltage sensor on the capacitor assembly which is receiving current helps in determining the resonant or tuning of the circuit. For example, if the voltage on this capacitor assembly does not reach or exceed V+, the capacitance must be decreased for subsequent phases. If the voltage in the receiving capacitor assembly reaches 2V+ too soon, the capacitance must be increased.

The voltage of the capacitor assembly supplying current indicates the proper pumping timing.

Motor stop or reversal may occur at any phase. In fact, motor stoppage may be accomplished by allowing current to flow continually from the voltage supply source to the various grounds. Motor reversal occurs when the phase order is reversed. As those skilled in the art will readily understand, reversing the phase order requires the use of different switches to route charge from the charge capacitor assembly through the proper winding in the proper direction and into the selected destination capacitor assembly with the proper pumping sequence.

It should further be noted that negative pumping (using either the thirteenth or fourteenth switch 352, 354) may be required to discharge capacitor assemblies when changes in load or speed are encountered. Switches fifteen and sixteen 356, 358, as well as voltage supply 360, are provided to complete the present embodiment's ability to freely control the flow of electrical charge throughout the circuit.

In addition, the phases described above are disclosed by the winding selected and the direction of the current in the winding, regardless of the switches and capacitor assemblies used or combined to accomplish the proper current flow. As such, the first phase is provided by forward current flow in the first winding 314, the second phase is achieved by forward current flow in the second winding 330, the third phase is accomplished by reverse current flow in the first winding 314, and the fourth phase is achieved by reverse current flow in the second winding 330.

It is also noted that the control and timing of the switches utilized in accordance with the system described above are critical to the operation of the system. An analog or digital control loop providing proper timing and changing of the switches based on the sensor measurements is integral to the system. However, those skilled in the art will readily appreciate the control and timing considerations which should be taken to achieve desired results. In addition, because of the zero current switching characteristics of the system, it is anticipated that SCRs (silicone controlled rectifiers) will be used in the construction of the switches.

Further, the first, seventh, fifteenth and sixteenth switches 306, 326, 352, 354 associated with the power voltage supply and ground are unidirectional (see FIG. 4A), while all other switches in the design must be bidirectional switches such as those described with reference to FIG. 4B. The simplification and combination of some of the switches may be required to reduce the diode voltage drop experienced by the system. The system disclosed with reference to FIG. 7 is symmetrical for a two winding bipolar motor and may be readily developed for motors with any number of windings.

Figure 8:
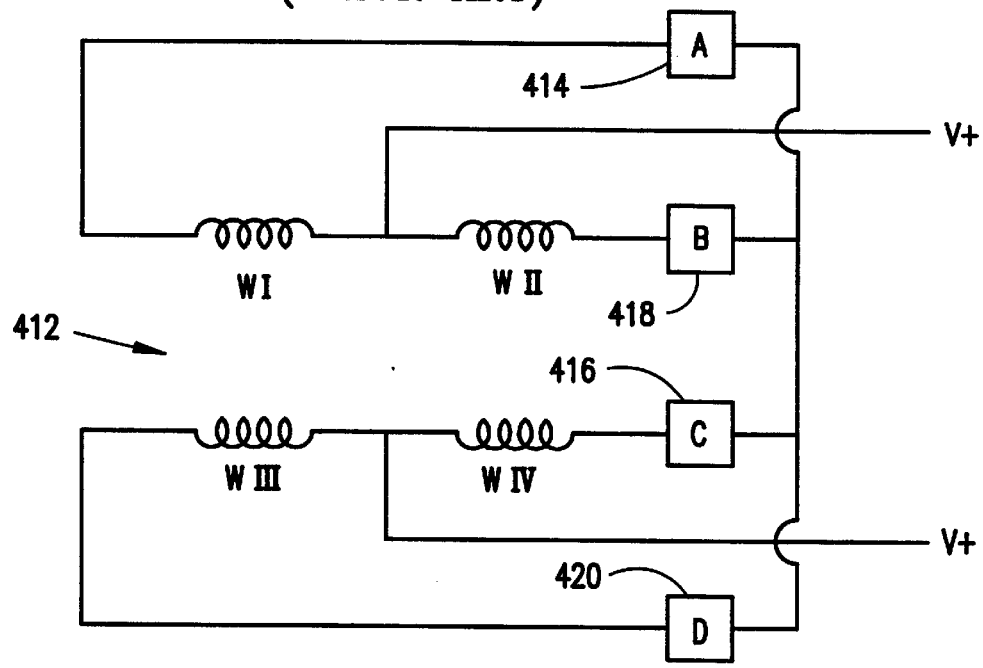
FIG. 8 is a circuit diagram of a conventional prior art control system used with unipolar stepper motors.

With reference to FIG. 8, a conventional prior art control system 412 for use with unipolar stepper motors is disclosed. Unipolar stepper motors have no permanent magnet and instead employ more windings to achieve the multiple phases required to work the motor efficiently. In accordance with the disclosed prior art system, the first phase is entered by opening the first switch 414, the second phase is entered by opening the second switch 416, the third phase is entered by opening the third switch 418 and the fourth phase is entered by opening the fourth switch 420. As with bipolar stepper motors, the phases may be overlapped for half-stepping. In true unipolar stepper motors the windings only conduct electrical charge in one direction and some unipolar stepper motors, therefore, employ diodes to prevent the reverse flow of electrical charge.

Figure 9:
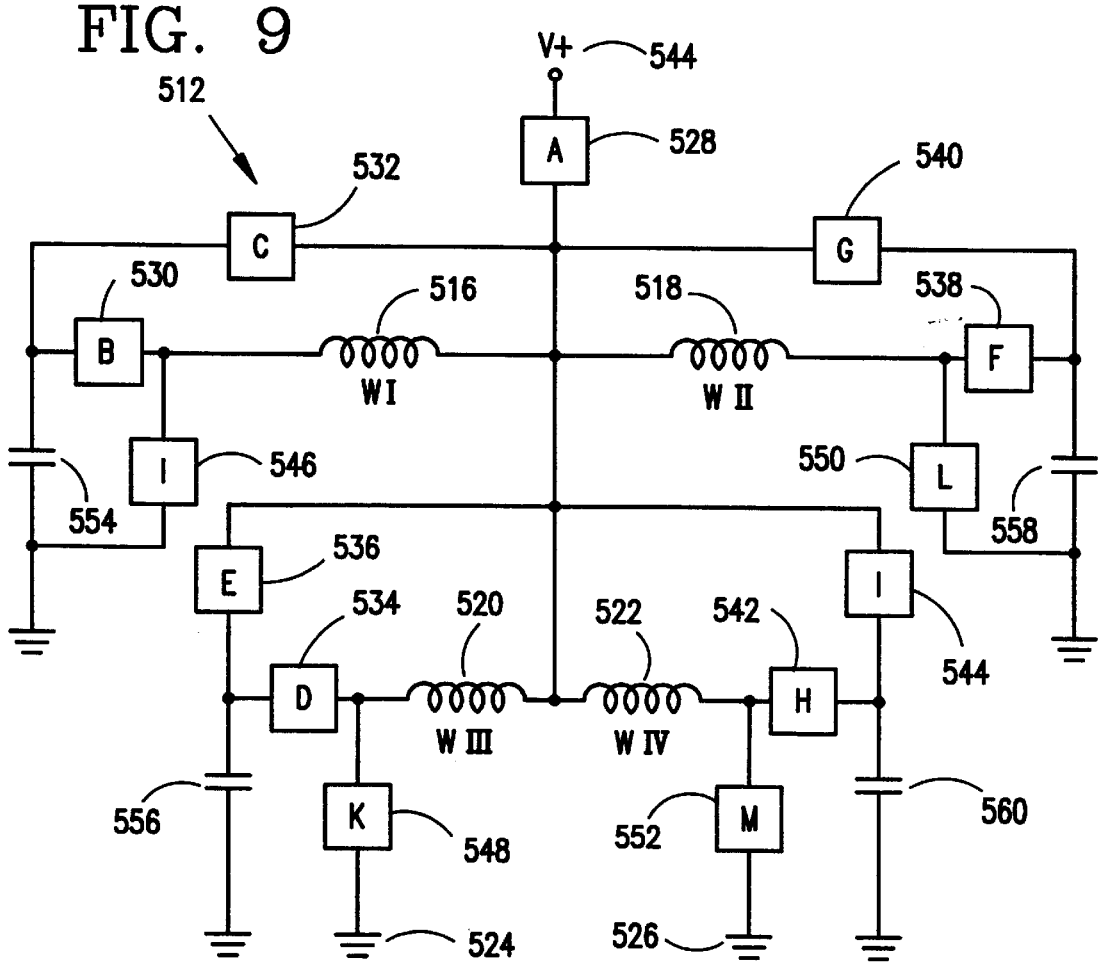
FIG. 9 is a circuit diagram of a control system for use with unipolar stepper motors in accordance with the present invention.

FIG. 9 discloses a control system 512 in accordance with the present invention for use with unipolar stepper motors. In accordance with the invention, the control system 512 includes a first electrical charge source 514, first, second, third and fourth windings 516, 518, 520, 522 and first and second grounds 524, 526 which are generally connected in practice. The system 512 further includes first, second, third, fourth, fifth, sixth, seventh, eighth, ninth, tenth, eleventh, twelfth and thirteenth switches 528–552 controlling the flow of electrical charge through the various windings. All of the switches used in the system described above are unidirectional as described in FIG. 4a.

The control system 512 will now be described in detail with reference to its operation. The first phase is entered by opening the first and second switches 528, 530 (with the other switches closed). This permits the flow of electrical charge from the first electrical charge source 514, through the first winding 516 and into the first capacitor assembly 554. The second phase is then initiated by opening the third and fourth switches 532, 534 (with other switches closed). This permits the flow of electrical charge from the first capacitor assembly 554, through the third winding 520, and into the second capacitor assembly 556. The third phase is entered by opening fifth and sixth switches 536, 538 (with other switches closed) permitting the flow of electrical from the second capacitor assembly 556, through the second winding 518, and into the third capacitor assembly 558. Finally, the fourth phase is entered by opening the seventh and eighth switches 540, 542 to permit the flow of electrical charge from the third capacitor assembly 558, through the fourth winding 522, and into the fourth capacitor assembly 560.

As in the control system discussed above and designed for use with bipolar stepper motors, the first switch 528 is utilized to pump the circuit when voltage sensors detect insufficient voltage to drive a specific phase in a capacitor assembly. Similarly, the tenth, eleventh, twelfth and thirteenth switches 546, 548, 550, 552 are respectively activated when voltage sensors detect that a capacitor assembly is not sufficiently discharged for efficient operation. In addition, voltage sensors are used at the capacitors and current sensors at the windings to determine the proper pumping timing and the tuning of the capacitor assemblies to ensure system resonance. Pumping is always accomplished in the system described in FIG. 8 using the first switch 528.

In actual operation under load, a small amount of pumping occurs with every cycle. The pumping current is equivalent to the actual energy expended by the motor, plus the energy lost to friction and heat dissipation.

As with the previously discussed control systems, the control system disclosed in FIG. 8 allows for reverse from any phase, for position holding in any phase, and for resonant and cycle starting in any phase. The abundance of routing switches used in the present control system allows additional voltage or ground pumping in any phase to deliver needed power for increased loads.

While the preferred embodiments have been shown and described, it will be understood that there is no intent to limit the invention by such disclosure, but rather, is intended to cover all modifications and alternate constructions falling within the spirit and scope of the invention as defined in the appended claims.

What is claimed is:

1. A stepper motor, comprising:
   a rotor positioned within a stator for relative motion;
   a control system associated with the stator and rotor for controlling relative motion, the control system is a resonant circuit which conserves electrical charge and comprises:
      a first winding positioned between a first electrical charge source and a first capacitor assembly;
      a first switch positioned between the first electrical charge source and the first winding for controlling the flow of electrical charge between the first electrical charge source and the first capacitor assembly through the first winding by selectively permitting the flow of electrical charge in a first direction in which the electrical charge sequentially flows from the first electrical charge source, through the first switch and the first winding, and into the first capacitor assembly, and preventing the flow of electrical charge in a second direction opposite the first direction;
      a second switch positioned between a ground and the first winding for controlling the flow of electrical charge from the first capacitor assembly and through the first winding by selectively permitting the flow of electrically charge in the second direction in which the electrical charge sequentially flows from the capacitor assembly, through the first winding and second switch, and into the ground, and preventing the flow of electrical charge in the first direction opposite the second direction;
      wherein phase one begins with the opening of the first switch causing the flow of electrical charge through the first winding in the first direction and a predetermined relative movement between the stator and rotor, and phase two begins with closing the first switch and opening the second switch to cause the flow of electrical charge in the second direction from the first capacitor assembly and through the first winding thus causing a predetermined relative movement between the stator and rotor.

2. The stepper motor according to claim 1, further including a second winding positioned in communication with a second capacitor assembly.

3. The stepper motor according to claim 2, further including a third switch controlling the flow of electrical charge through the second winding in a first direction and into the second capacitor assembly;
   a fourth switch controlling the flow of electrical charge from the second capacitor assembly and through the second winding in a second direction;
   wherein phase three begins within the opening of the third switch causing the flow of electrical charge through the second winding in a first direction to cause a predetermined relative movement between the stator and rotor, and phase four begins with closing the third switch and opening the fourth switch to cause the flow of electrical charge in the second direction through the second winding thus causing a predetermined relative movement between the stator and rotor.

4. The stepper motor according to claim 3, wherein the first and second windings are electrically linked.

5. The stepper motor according to claim 3, wherein the stepper motor is bipolar.

6. The stepper motor according to claim 3, wherein the stepper motor has a unipolar configuration.

7. The stepper motor according to claim 6, further including a third winding positioned in communication with a capacitor assembly and a fourth winding positioned in communication with a capacitor assembly.

8. The stepper motor according to claim 6, wherein the first, second, third and fourth windings are electrically linked.

9. The stepper motor according to claim 1, wherein the first capacitor assembly includes a series of capacitors adapted to control the capacitance of the control system.

10. The stepper motor according to claim 9, wherein the flow of electrical charge to the series of capacitors is controlled by a series of switches associated with the series of capacitors.

11. The stepper motor according to claim 9, wherein the series of capacitors are connected in parallel.

12. The stepper motor according to claim 11, wherein each capacitor in the series of capacitors has half the capacitance of the previous capacitor.

13. The stepper motor according to claim 1, wherein at least one of the first and second switches is a unidirectional switch.

14. The stepper motor according to claim 13, wherein the unidirectional switch includes a bias diode and a MOSFET.

15. The stepper motor according to claim 1, wherein at least one of the first and second switches is a bidirectional switch.

16. The stepper motor according to claim 15, wherein the bidirectional switch includes first and second MOSFETs.

17. A control system adapted for associated with the stator and rotor of a stepper motor for controlling their relative movement control the movement of the stepper motor, the control system comprising;
   an electrical charge source;
   a first winding positioned between the electrical charge source and a first capacitor assembly;
   a first switch positioned between the electrical charge source and the first winding for controlling the flow of electrical charge between the electrical charge source and the first capacitor assembly through the first winding by selectively permitting the flow of electrical charge in a first direction in which the electrical charge sequentially flows from the electrical charge source, through the first switch and the first winding, and into the first capacitor assembly, and preventing the flow of electrical charge in a second direction opposite the first direction;
   a second switch positioned between a ground and the first winding for controlling the flow of electrical charge from the first capacitor assembly and through the first winding by selectively permitting the flow of electrically charge in a second direction in which the electrical charge sequentially flows from the capacitor assembly, through the first winding and second switch, and into the ground, and preventing the flow of electrical charge in a first direction opposite the second direction;

a second winding positioned between the electrical charge source and a second capacitor assembly;

a third switch positioned between the electrical charge source and the second winding for controlling the flow of electrical charge between the electrical charge source and the second capacitor assembly through the second winding by selectively permitting the flow of electrical charge in a first direction in which the electrical charge sequentially flows from the electrical charge source, through the first switch and the first winding, and into the second capacitor assembly, and preventing the flow of electrical charge in a second direction opposite the first direction;

a fourth switch positioned between a ground and the second capacitor assembly for controlling the flow of electrical charge from the second capacitor assembly through the first winding by selectively permitting the flow of electrically charge in a second direction in which the electrical charge sequentially flows from the second capacitor assembly, through the second winding and second switch, and into the ground, and preventing the flow of electrical charge in a first direction opposite the second direction; and wherein phase one begins within the opening of the first switch causing the flow of electrical charge through the first winding in a first direction and a predetermined relative movement between the stator and rotor, phase two begins within the opening of the third switch causing the flow of electrical charge through the second winding in a first direction and a predetermined relative movement between the stator and rotor, phase three begins with closing the first switch and opening the second switch to cause the flow of electrical charge in the second direction through the first winding thus causing a predetermined relative movement between the stator and rotor, and phase four begins with closing the fourth switch and opening the second switch to cause the flow of electrical charge in the second direction through the second winding thus causing a predetermined relative movement between the stator and rotor.

18. The control system according to claim 17, wherein the control system employs a resonant circuit.

19. The control system according to claim 17, wherein the control system conserves electrical charge.

20. The control system according to claim 17, wherein the first and second windings are electrically linked.

21. The control system according to claim 17, further including a third winding positioned in communication with a capacitor assembly and a fourth winding positioned in communication with a capacitor assembly.

22. The control system according to claim 21, wherein the first, second, third and fourth windings are electrically linked.

23. The control system according to claim 17, wherein the capacitor assembly includes a series of capacitors adapted to control the applied capacitance of the control system.

24. The control system according to claim 23, wherein the flow of electrical charge to the series of capacitors is controlled by a series of switches associated with the series of capacitors.

25. The control system according to claim 23, wherein the series of capacitors are connected in parallel.

26. The control system according to claim 25, wherein each capacitor in the series of capacitors has a half that of the previous capacitor.

27. The control system according to claim 17, wherein at least one of the first, second, third or fourth switches is a unidirectional switch.

28. The stepper motor according to claim 27, wherein the unidirectional switch includes a bias diode and a MOSFET.

29. The stepper motor according to claim 17, wherein at least one of the first, second, third or fourth switches is a bidirectional switch.

30. The stepper motor according to claim 29, wherein the bidirectional switch includes first and second MOSFETs.

31. A stepper motor, comprising:

a rotor positioned within a stator for relative motion;

a control system associated with the stator and rotor for controlling relative motion, the control system is a resonant circuit which conserves electrical charge and comprises:

a first winding positioned between a first electrical charge source and a first capacitor assembly;

a first switch controlling the flow of electrical charge between the first electrical charge source and the first capacitor assembly through the first winding in a first direction;

a second switch controlling the flow of electrical charge from the first capacitor assembly and through the first winding in a second direction;

the first capacitor assembly includes a series of capacitors adapted to control the capacitance of the control system and the flow of electrical charge to the series of capacitors is controlled by a series of switches associated with the series of capacitors;

wherein phase one begins with the opening of the first switch causing the flow of electrical charge through the first winding in a first direction and a predetermined relative movement between the stator and rotor, and phase two begins with closing the first switch and opening the second switch to cause the flow of electrical charge in the second direction from the first capacitor assembly and through the first winding thus causing a predetermined relative movement between the stator and rotor.

32. A stepper motor, comprising:

a rotor positioned within a stator for relative motion;

a control system associated with the stator and rotor for controlling relative motion, the control system is a resonant circuit which conserves electrical charge and comprises:

a first winding positioned between a first electrical charge source and a first capacitor assembly;

a first switch controlling the flow of electrical charge between the first electrical charge source and the first capacitor assembly through the first winding in a first direction;

a second switch controlling the flow of electrical charge from the first capacitor assembly and through the first winding in a second direction;

the first capacitor assembly includes a series of capacitors connected in parallel for controlling the capacitance of the control system and wherein each capacitor in the series of capacitors has half the capacitance of the previous capacitor;

wherein phase one begins with the opening of the first switch causing the flow of electrical charge through the first winding in a first direction and a predetermined relative movement between the stator and rotor, and phase two begins with closing the first switch and opening the second switch to cause the flow of electrical charge in the second direction from the first capacitor assembly and through the first winding thus causing a predetermined relative movement between the stator and rotor.

* * * * *